Jan. 10, 1961  J. F. PRIBONIC  2,967,547
HEIGHT CONTROL VALVE
Filed July 23, 1958  5 Sheets-Sheet 1
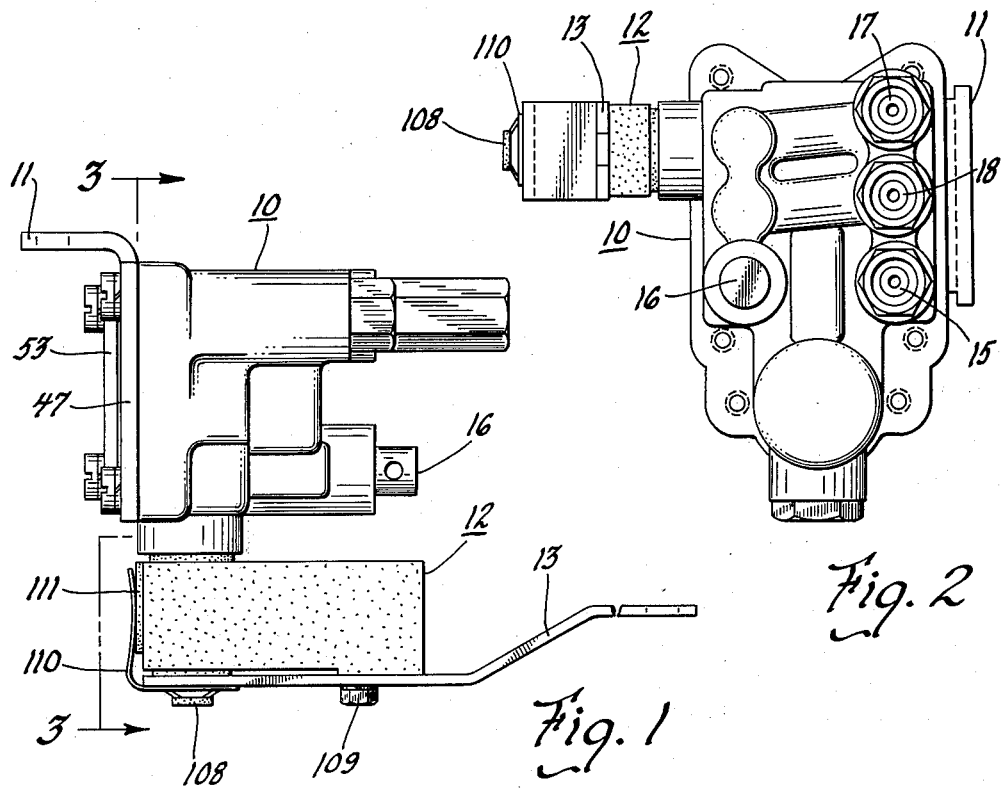
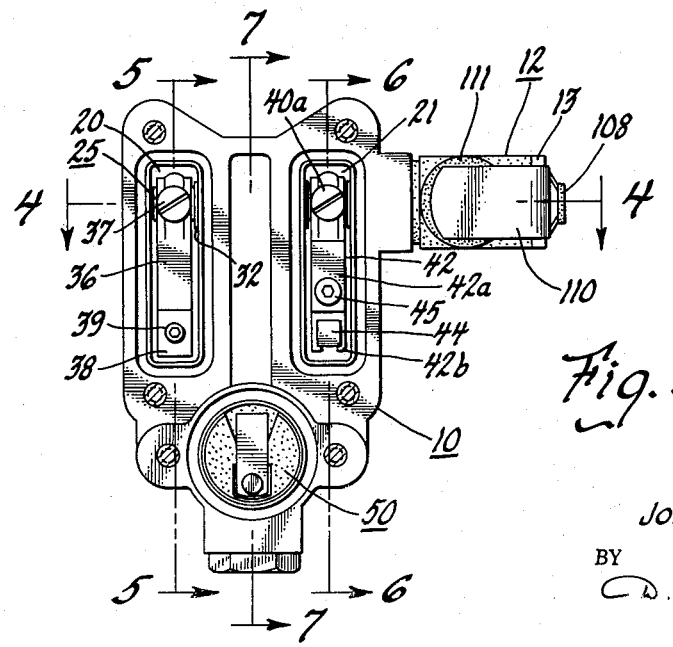
INVENTOR
JOHN F. PRIBONIC
BY
D. C. Staley
HIS ATTORNEY Jan. 10, 1961 J. F. PRIBONIC 2,967,547
HEIGHT CONTROL VALVE
Filed July 23, 1958 5 Sheets-Sheet 2

INVENTOR
JOHN F. PRIBONIC
BY
C. b. Staley
HIS ATTORNEY

INVENTOR
JOHN F. PRIBONIC
BY
D. C. Staley
HIS ATTORNEY

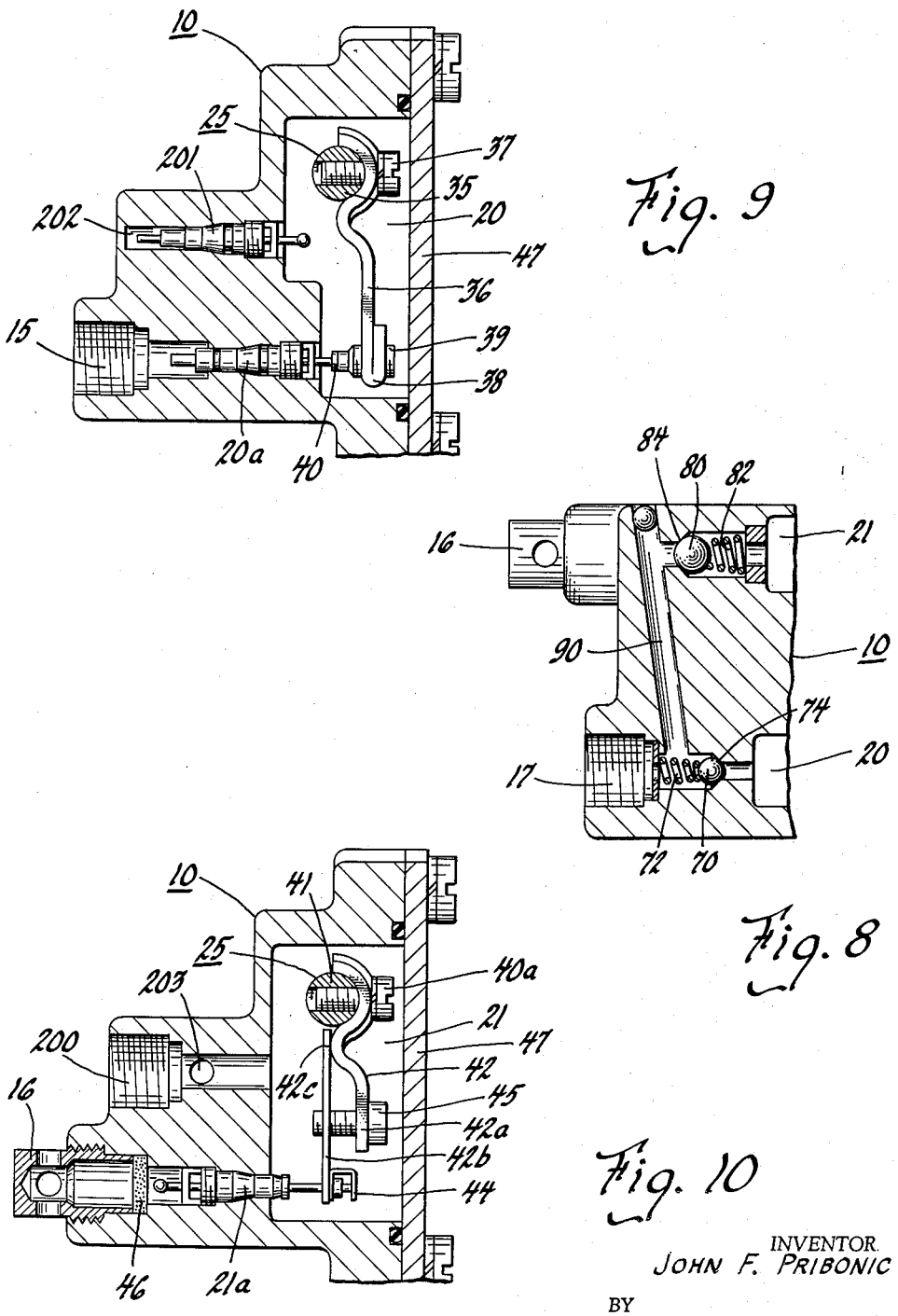

United States Patent Office 2,967,547
Patented Jan. 10, 1961

2,967,547

HEIGHT CONTROL VALVE

John F. Pribonic, Dayton, Ohio, assignor to General Motors Corporation, Detroit, Mich., a corporation of Delaware Filed July 23, 1958, Ser. No. 750,336

9 Claims. (Cl. 137—627.5)

This invention relates to a height control valve or a leveling valve adapted for use with an air suspension system on a motor vehicle.

Motor vehicles are today being manufactured in which the leaf springs or the coil springs are replaced with air springs. The air springs may be flexible diaphragm structures or bellows structures, or in some instances, the air springs consist of a hollow container having a piston element movable into the container with a flexible diaphragm disposed between the container and the piston element. The air springs are adapted to receive air under pressure to support the sprung mass of the body upon the unsprung mass of the axle and running gear of the vehicle.

The air springs are adapted to receive controlled air pressure in a manner that the air pressure within the air springs varies in relation to the load being carried by the vehicle so that the sprung mass of the vehicle will maintain a predetermined clearance relative to the road and to the unsprung mass or running gear of the vehicle.

Control valves are used to regulate the air pressure within the air springs to supply air under pressure to the air springs when the predetermined clearance height between the sprung mass and the unsprung mass is lessened, or to exhaust air from the air springs when the predetermined clearance height is increased. These height control valves or leveling valves are usually secured to the chassis or the sprung mass of the vehicle with suitable linkage connecting with the unsprung mass or the axle so that the actuation of the valve responds to any change in the normal predetermined clearance height between the sprung mass and the unsprung mass of the vehicle.

These height control valves or leveling valves are provided with air pressure inlet control valves that are opened to allow air under pressure to flow to the air springs and include other air pressure exhaust control valves that are opened to allow air to exhaust from the air springs, the valves being actuated by suitable mechanism responding to a decrease or an increase of the predetermined clearance height between the sprung mass and the unsprung mass of the vehicle.

While some air suspension systems for motor vehicles incorporate only the use of supply and exhaust valves for regulating the air pressure within the air springs, other height control or leveling valves have incorporated therein a damping mechanism that retards movement of the actuating mechanism of the valve and thereby delay opening of the air pressure inlet and exhaust valves rather than having these valves open and close in rapid sequence as a result of movement of the axle relative to the body of the vehicle caused by road roughness.

The damping mechanism used in some height control or leveling valves delays the action of the operation of the inlet and exhaust valves so that air will not be continuously supplied or exhausted from the air springs as a result of movement of the axle of the vehicle caused by road roughness. Therefore, an air suspension system utilizing a height control or leveling valve that includes a damping mechanism uses a lesser volume of air in operation of the air suspension system than a valve that does not incorporate such a damping mechanism. However, the damping mechanism does not prevent the height control valve or leveling valve from responding to a change in clearance height between the sprung mass and the unsprung mass of the vehicle which represents a load change in the vehicle. Such a load change will result in an average operating position of the valve actuating mechanism indicating either a lower-than-normal clearance height or an above-normal clearance height under which condition the inlet and exhaust valves of the height control valve will be actuated to compensate the air pressure in the air springs to return the sprung mass to a predetermined clearance height in the same manner as valves that do not incorporate damping mechanisms.

In this invention the height control valve consists of a valve body structure that is provided with independent air inlet and air exhaust chambers, the air inlet control valve and the exhaust control valve being suitably in fluid communication with the inlet and exhaust chambers. A damping mechanism is disposed within the valve body generally between the inlet and exhaust chambers with the damping mechanism consisting of a piston reciprocable in a cylinder, the piston and cylinder being disposed generally at corresponding ends of the inlet and exhaust chambers. An actuating shaft extends through the valve body and carries actuating arms that operate the inlet and exhaust valves, and also carries an actuating member to actuate the damping piston within its cylinder. An overtravel mechanism is supported on the end of the actuating shaft that projects from the valve body so that the large axle movements relative to the body of the vehicle can be absorbed without transmission of the full movement to the valve mechanism which normally has a relatively narrow limit of movement of the valve mechanism.

The damping piston is constructed of a material that has a greater rate of contraction and expansion than the material of which the cylinder for the damping piston is constructed so that as the temperature of the environment of the height control valve falls, with resultant increase of viscosity of the damping fluid within the damping cylinder, the clearance between the outer periphery of the damping piston and the inner periphery of the cylinder will increase, resulting in substantially constant flow rate of the damping fluid between opposite ends of the cylinder. Of course, on an increase of temperature the reverse situation is also true.

The damping piston is also constructed and arranged relative to the cylinder that the piston will damp movement of the valve mechanism when it moves in either direction from a center position, but will permit a quick return of the damping piston to center position and thereby allow for quick closure of either the exhaust or inlet valves, which opening movement was damped. To provide for this result, the damping piston carries valving for either direction of movement of the damping piston from its center position that will effect trapping of damping fluid in the end of the cylinder toward which the damping piston is moving, but which valving will permit free flow of damping fluid back into the cylinder end toward which the piston was just moving whereby the damping piston can effect a quick return to its center position from which it will be immediately damped in an opposite direction of movement.

The height control valve of this invention also incorporates in the valve body, check valve arrangements that are in communication with the inlet and the exhaust chambers so that free flow of air under pressure to the air springs and exhaust of pressure from the air springs can take place freely, but which prevents cross flow of air between a pair of air springs supplied by a single height control valve, or where a single height control valve regulates a single air spring which will prevent cross flow of air between the air spring controlled by the valve and a second spring controlled by a second like valve.

Further objects and advantages of the present invention will be apparent from the following description, reference being had to the accompanying drawings wherein preferred embodiments of the present invention are clearly shown.

In the drawings:

Fig. 1 is an elevational view of the height control valve illustrating the positions of the body of the valve relative to the overtravel mechanism for the same.

Fig. 2 is an elevational view of the height control valve taken from the right-hand end of the structure of Fig. 1.

Fig. 3 is a cross-sectional view of the valve taken along line 3—3 of Fig. 1 illustrating the inlet and exhaust chambers and the damping piston, the end closure for the valve being removed.

Fig. 8 is a cross-sectional view taken along line 8—8 of Fig. 6 illustrating the cross flow connection between the check valves in the inlet chamber and the check valves in the outlet chamber of the height control valve.

Fig. 9 is a cross-sectional view comparable to Fig. 5 but of a modified form of valve having a single outlet to an air spring in place of the dual outlet of Fig. 5.

Fig. 10 is a cross-sectional view comparable to Fig. 6 but of a modified form of valve utilizing a single outlet opening to an air spring.

Figure 5:
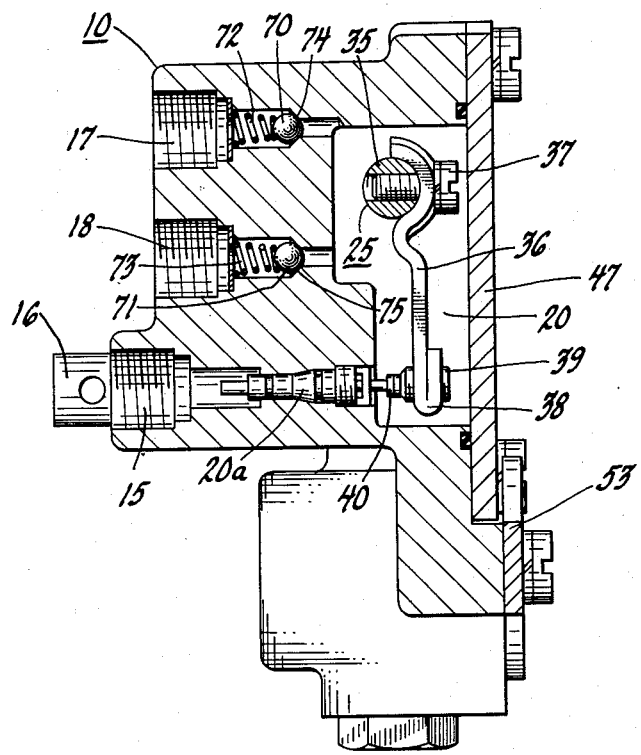
Fig. 5 is a cross-sectional view taken along line 5—5 of Fig. 3 illustrating the air inlet chamber, the air inlet control valve, and certain check valves communicating with this chamber.

The height control valve of this invention consists of a valve body 10 having a bracket 11 adapted for attachment of the valve body to the chassis or a sprung mass of a motor vehicle. The height control valve 10 also incorporates an overtravel mechanism 12 that includes an arm 13 adapted for connection to the axle or unsprung mass of the vehicle whereby oscillation of the arm 13 will effect actuation of the valve actuating mechanism. The height control valve 10 has an inlet port 15 adapted for connection with a source of air under pressure. An exhaust port 16 is provided for allowing exhaust of air from the air springs. The valve also includes a pair of air spring supply ports 17 and 18 that are connected individually with separate air springs, such as the air springs on the left-hand and right-hand sides respectively at the front end of a motor vehicle.

The height control valve 10, that is the body of the valve, has a chamber 20 that forms an air pressure inlet chamber and has a chamber 21 that forms an air exhaust chamber. These chambers 20 and 21 are positioned in spaced parallel relation, as shown in Fig. 3, and are independent one from the other except for certain check valve passages to be hereinafter described.

An inlet air pressure control valve 20a is located in the inlet port 15 in the valve body and controls supply of air under pressure into the inlet chamber 20 in a manner hereinafter described.

An air pressure exhaust control valve 21a is provided in the exhaust port 16 and controls exhaust of air under pressure from the exhaust chamber 21 in a manner hereinafter described.

The valve body 10 has a bore 22 that extends from one side of the body into the exhaust chamber 21. The body also has a bore 23 that extends between the exhaust chamber 21 and the inlet chamber 20. A valve actuating shaft 25 has a journal portion 26 rotatably received in the bore 22 and has a journal portion 27 received in the bore 23 whereby to support the actuating shaft 25 in the valve body 10 for oscillating rotation. The shaft 25 carries O ring seals 28 and 29 on journal portion 27 that prevent interchange of air pressure between the inlet chamber 20 and the exhaust chamber 21. O ring seals 30 and 31 are provided on the journal portion 26 to prevent loss of air from the exhaust chamber 21 and prevent entry of dirt into the overtravel mechanism 12. A snap ring 32 is located at the left-hand end of journal portion 27 of the shaft 25 which prevents the shaft from removal from the bores 23 and 22.

The end portion 35 of the shaft 25 is located within the inlet chamber 20 and carries a valve actuating arm 36, being secured to the shaft portion 35 by the screw 37. The free end 38 of the arm 36 carries an adjusting screw 39 that engages the stem 40 of the inlet control valve 20a, so that movement of the arm 36 in a clockwise direction, as viewed in Fig. 5, will open the inlet valve 20a for supply of air under pressure into the inlet chamber 20. The adjusting screw 39 is provided to take care of manufacturing variations of the valve structure so that the inlet valve 20a will be closed when the arm 36 is in neutral position.

The shaft 25 has a portion 41 within the exhaust chamber 21 and receives an actuating arm 42 secured to the shaft by a screw 40a that engages the stem 43 of the exhaust control valve 21a to open the same when the arm 42 moves in a counterclockwise direction. A U-shaped member 44 is carried on the end of the valve stem 43 and is independent of the valve arm 42 so that the valve arm 42 can move in a clockwise direction away from the head on the stem 43 to allow the valve 21a to remain closed during clockwise direction of movement of the arm 42.

The arm 42 consists of two members 42a and 42b secured together at the juncture 42c so that the two members 42a and 42b act as one element. An adjusting screw 45 is free for rotation in member 42a, but is threaded into member 42b to move the member 42b relative to member 42 a to effect adjustment of the arm 42 so that the exhaust valve 21a will be in closed position when the actuating shaft 25 is in neutral position. This also establishes the neutral position of the inlet valve actuating arms 36.

A filter member 46 is provided in the exhaust port 16 to reduce noise of air exhausting from the valve, and also prevent entry of dirt into the exhaust control valve 21a. A cover plate 47 closes the inlet chamber 20 and the exhaust chamber 21.

Figure 7:
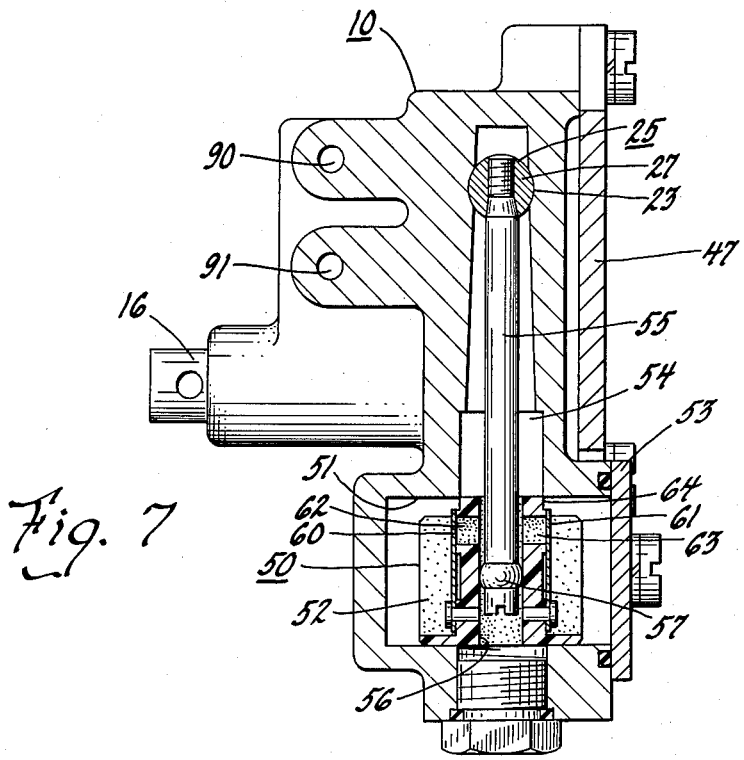
Fig. 7 is a cross-sectional view taken along line 7—7 of Fig. 3 illustrating the damping mechanism for the valve.
Figure 6:
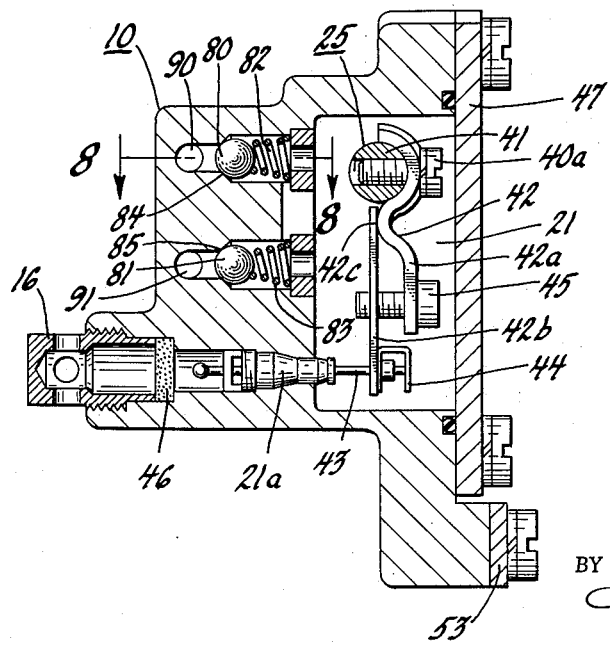
Fig. 6 is a cross-sectional view taken along line 6—6 of Fig. 3 illustrating the exhaust chamber, the exhaust control valve and said check valves communicating with this chamber.

Rotating oscillating movement of the actuating shaft 25 is damped by a damping mechanism 50 that consists of a cylinder 51 in which a damping piston 52 is reciprocable. The cylinder 51 has a closure plate 53 so that the cylinder 51 can be filled with damping fluid which also partially fills a chamber 54 extending radially from the cylinder 51 in the valve 10, as shown in Fig. 7. The chamber 54 has an actuating shaft 25 extending through the same at the upper end of the chamber, the shaft receiving an actuating rod 55 that extends downwardly in perpendicular fashion into a radial bore 56 in the damping piston 52. The actuating member 55 has an enlarged head 57 that engages the bore 56 to effect reciprocation of the piston in the cylinder 51 on rotary oscillation of the actuating shaft 25. The normal clearance provided between the outer periphery of the damping piston and the inner periphery of the cylinder 51 provides the restriction passage for flow of damping fluid between opposite ends of the cylinder 51 as the damping piston is reciprocated.

The damping fluid in the cylinder 51 changes viscosity in direct relation to temperature, that is as temperature falls the viscosity increases, and as the temperature rises the viscosity decreases. With a constant resistance provided by the clearance between the damping piston and the cylinder, the flow rate of the damping fluid through the resistance will vary in direct relation to the viscosity of the damping fluid. Thus as the temperature of the environment of the valve decreases, the delay factor of the damping piston increases because the flow rate of the damping fluid of increased viscosity is such as to increase the delay movement of the damping piston. Of course, as the temperature of the environment of the valve increases, the reverse action results. Under extreme cold weather conditions, the effect of the damping piston can be nil when the viscosity of the damping fluid becomes quite high.

To eliminate this change in the rate of damping movement of the piston, and thereby eliminate the change in damping actuation on the valve mechanism, the damping piston 52 is constructed of a material that has a greater rate of contraction and expansion than the material forming the cylinder 51. Thus, as the temperature of the environment of the valve decreases, the clearance between the damping piston 52 and the cylinder 51 will increase so that the flow rate of the damping fluid of increased viscosity through the increased clearance, and thereby reduced resistance, will remain substantially the same as when the environment of the valve was at a higher temperature. Thus, the damping piston is self-compensating as to temperature factor so that the damping actuation on the valve actuating mechanism will remain substantially the same regardless of the temperature environment of the height control valve.

The damping device 50 is also provided with an arrangement by which damping action will be obtained in either direction of movement of the damping piston from the center position illustrated in Fig. 7, but the damping piston 52 will be allowed to return to its center position quickly from either end position in the damping cylinder. Such an arrangement provides for damping control of the valve actuating mechanism on opening movement of either the exhaust valve 21a or the inlet valve 20a to slow the action of the opening of these valves to eliminate the effect of road roughness on the valve actuating mechanism, but which permits the inlet and exhaust valves to close quickly after once being opened and the valve actuating mechanism is returning to neutral. Such a system reduces the effect of overrun of supply of air to the air spring on opening of the inlet valve 20a, as well as overrun of the exhaust of air from the air spring on opening of the exhaust valve 21a.

The quick return to center of the damping piston 52 is provided for by the use of the flap valves 60 and 61 closing the ports 62 and 63 respectively that communicate with the center bore 56 in the piston 52. These valves 60 and 61, together with the width of the chamber 54, which is not greater than the length of the piston portion 64 adjacent the chamber 54, controls the quick return to center of the piston 52.

With the piston portion 64 being substantially the same length as the width of the chamber 54, it will be apparent that on movement of the piston 52 in a left-hand direction from its center position, as shown in Fig. 7, damping fluid contained in the cylinder 51 on the left-hand side of the piston 52 can escape only around the periphery of the piston. This will provide for damping movement of the piston 52 in its left-hand direction of movement from its center position.

As the piston 52 moves in a left-hand direction, the right-hand edge of the portion 64 of the piston 52 will pass beyond the right-hand edge of the chamber 54 and thereby leave a substantial clearance between the piston and the edge of the chamber 54 so that when the piston 52 begins its right-hand direction of movement for return to center, free flow of damping fluid will be obtained from the chamber on the right-hand side of the piston 52 around the right-hand edge of the portion 64 of the piston 52 into the chamber 54, and thence into the bore 56 in the piston 52, and through the port 62 opening valve 60 to allow the fluid to enter the hamber on the left-hand side of the piston 52. This will allow the damping piston to move relatively freely in a right-hand direction back to its center position. Obviously, movement of the piston in a right-hand direction will result in the same type of operation.

The valve body 10 contains a pair of check valves 70 and 71 positioned in the air spring supply ports 17 and 18 that are spring urged by the springs 72 and 73 respectively into engagement with their respective seats 74 and 75 whereby free flow of air under pressure is provided for from the air inlet chamber 20 into the supply ports 17 and 18, but return flow of air from the supply ports, and thus from the air springs, is prevented admission into the chamber 20.

A pair of check valves 80 and 81 are contained within the valve body 10 in flow communication with the exhaust chamber 21, the check valves being spring urged by the springs 82 and 83 upon their respective seats 84 and 85.

The air spring supply port 17 is connected with the exhaust chamber 21 by the passage means 90, the inlet end of the passage 90 being connected into the supply port 17 on the down-flow side of the check valve 70, whereas the outlet end of the passage 90 connects with the up-flow side of the check valve 80.

The air spring supply port 18 is similarly connected by passage means 91 with the exhaust chamber 21 through the check valve 81.

Thus, when air under pressure is admitted into the air inlet chamber 21, air can flow through the check valves 70 and 71 into the air spring supply ports 17 and 18. This air under pressure will also pass through the passages 90 and 91, and through the check valves 80 and 81 into the exhaust chamber 21. But since the exhaust valve 21a is closed at this time, no air will be lost from the exhaust chamber, all air being supplied under pressure to the air springs through the supply ports 17 and 18.

When the exhaust valve 21a is opened for exhausting of air from the air springs, air will flow in a right-hand direction into the ports 17 and 18, but will be prevented from entry into the inlet chamber 20 by the check valves 70 and 71. The exhaust flow of air will pass through the passages 90 and 91 and thence through the check valves 80 and 81 into the exhaust chamber 21, and thence through the exhaust control valve 21a into the exhaust port 16 and thence to atmosphere.

When a vehicle is rounding a curve, the sprung mass tends to lean toward the outside of the curve with the result that the air spring on the outside of the curve tends to be compressed with a resultant increase of air pressure within the air spring. Concurrently, the air spring on the inside of the curve tends to expand with resultant lowering of air pressure in the air spring. If free communication is provided between the air springs on the two sides of the vehicle under this condition, air under pressure will tend to flow from the air spring on the outside of the curve to the air spring on the inside of the curve attempting to balance pressures between the two air springs, with the end result that the air pressure within the air spring on the outside of the curve is reduced at the very time the air pressure should be increased, or at least remain constant, to resist the leaning tendency of the sprung mass. Similarly, the air pressure being transmitted from the air spring on the outside of the curve to the air spring on the inside of the curve tends to build up pressure in the air spring at the very time pressure should be reduced on the inside of the curve to prevent a tendency toward urging the sprung mass into a more leaning condition.

To resist this transfer of air between the air springs on opposite sides of the vehicle, the check valves 70, 71, 80 and 81 come into play.

Assuming supply port 18 is conected with the left-hand air spring and port 17 is connected with the right-hand air spring of a vehicle, with the vehicle entering a right-hand curve, the left-hand air spring will tend to be compressed and the right-hand air spring will tend to be expanded. Under this condition, air under pressure will tend to flow back through the supply port 18, but check valve 71 will prevent flow of air into the inlet chamber 20 so that there can be no cross flow of air from the left-hand to the right-hand air spring through the inlet chamber 20. At the same time, this air under pressure tends to flow through the passage 91 and will also pass through the check valve 81 into the exhaust chamber 21, but check valve 80 will prevent the air from cross flow into the passage 90, thus gaining entry into the air supply port 17. Similarly, under reverse conditions, the actions of the check valves just referred to are reversed.

The valve actuating mechanism consisting of a shaft 25 and the valve actuating arms 36 and 42 are limited in the degree of movement of oscillation of the shaft 25, and, therefore, of movement of the arms 36 and 42 by means of the damping piston 52 engaging opposite ends of the cylinder 51 in either direction of reciprocation of the piston 52. Thus, the stroke of the piston 52 limits and controls the maximum swing of the arms 36 and 42 for controlling the maximum movement applied to the inlet valve 20a and the exhaust valve 21a.

The maximum degree of movement of the arms 36 and 42 is considerably less than the maximum degree of movement of the arm 13 connected with the overtravel mechanism 12 since the vertical movement of the axle of the vehicle must take into consideration the various conditions of road roughness. Thus, the overtravel mechanism 12 absorbs the difference in the degree of movement of the arm 13 relative to the degree allowed the arms 36 and 42.

Figure 4:
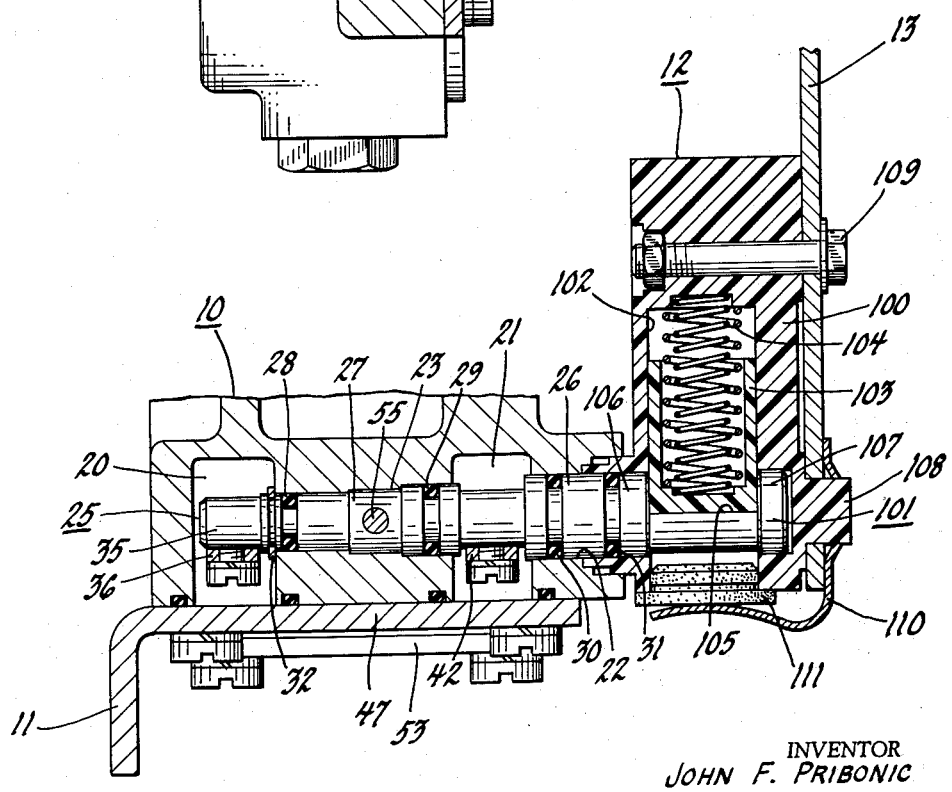
Fig. 4 is a cross-sectional view taken along line 4—4 of Fig. 3 illustrating the overtravel mechanism for the valve and the actuating shaft for the valve mechanism.

The overtravel mechanism 12, more particularly shown in Fig. 4, consists of a body member 100 carried on the end portion 101 of the actuating shaft 25 that projects outside the valve body 10. The body member 100 has a cylinder bore 102 that receives a piston 103 reciprocable therein. The piston 103 is hollow and receives compression spring means 104 that causes the piston 103 to engage a flat surface 105 on the end portion 101 of the shaft 25. The body member 100 is thus retained on the end portion 101 by the piston 103 being received between the enlarged portions 106 and 107 of the shaft 25. The actuating arm 13 is secured to the overtravel mechanism 12 by having one end fit over a projection 108 on the body 100 with a bolt 109 securing the arm 13 to the body 100. A spring member 110 retains a cap closure 111 in the outer end of the cylinder bore 102.

It will be apparent that a large reciprocable stroke of the arm 13 will cause the piston 103 to be moved against the compression springs 104 as the piston rides against opposite edges of the flat portion 105 on the shaft 25, thereby absorbing the greater degree of stroke of the arm 13 while transmitting oscillating motion of the shaft 25 to actuate the arms 36 and 42 within the limits allowed between stroke of the damping piston 52.

The height control valve heretofore described with reference to Figs. 1 to 8 is a dual outlet valve to supply two air springs concurrently on opposite sides of a vehicle. Figs. 9 and 10 illustrate modifications to be incorporated in the valve of Figs. 1 to 8 when the valve is a single outlet valve for supplying a single air spring with a height control valve being placed at each side of a vehicle and controlling the air spring on that respective side of the vehicle. The numerals applied to the illustrations in Figs. 9 and 10, wherein the valve elements are identical with the valve elements disclosed in Figs. 1 to 8, will therefore be the same. The structural elements that comprise the differences of the valve of Figs. 9 and 10 will carry reference numerals 200 and above.

With reference to Figs. 9 and 10, an air spring supply port 200 communicates with the exhaust chamber 21. The exhaust valve 21a of Fig. 10 controls the exhaust port 16 upon actuation thereof the arm 42 in the same manner heretofore described with reference to Figs. 1 to 8.

The air pressure inlet chamber 20, shown in Fig. 9 has a check valve 201 placed in a port 202 that communicates with the inlet chamber 20. The check valve 201 allows air under pressure to flow from the inlet chamber 20 into the port 202 and thence via the cross-flow port 203 into the discharge port 200 that connects with the air spring.

The inlet control valve 20a controlling the air pressure inlet port 15 is actuated by the arm 36, Fig. 9, in the same manner as heretofore described with reference to Figs. 1 to 8.

The check valve 201 communicating with the inlet port 20 therefore allows free flow of air from the air pressure inlet port 15 under control of the valve 20a from the chamber 20 into the port 202 and thence through the port 203 to the supply port 200 for supply of air under pressure to the air spring. When exhaust valve 21 is opened, air under pressure is prevented from return flow into the inlet port 20 by the check valve 201 so that all exhaust air will then pass through the exhaust control valve 21a.

Figure 11:
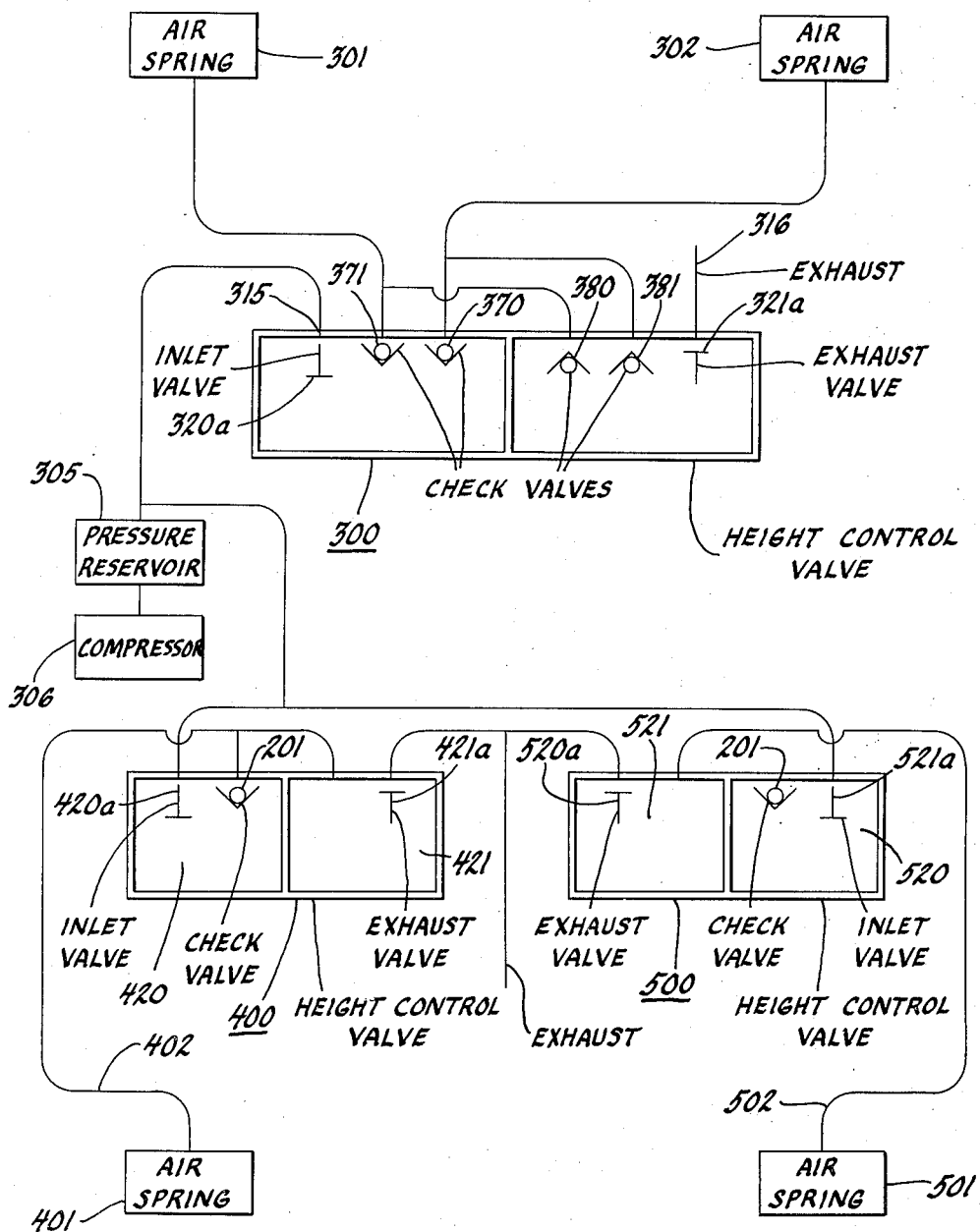
Fig. 11 is a schematic view of an air suspension system incorporating the dual outlet valve of Figs. 1 to 8 inclusive, as well as the single outlet valve of Figs. 9 and 10.

In Fig. 11 there is illustrated schematically a typical air suspension system using a dual outlet height control valve 300, of the type illustrated in Figs. 1 to 8, for controlling simultaneously supply of air to the air springs 301 and 302 and exhaust of air from these air springs. The air springs 301 and 302 are normally located at the front end of the vehicle with a single control valve regulating the air supply to and from the air springs.

At the rear of the vehicle there is normally provided one height control valve 400 of the type illustrated in Figs. 9 and 10 that has a single supply outlet for controlling the single air spring 401. Similarly, the control valve 500, of the type illustrated in Figs. 9 and 10, is used to control the air spring 501. The air springs 401 and 501 are located on opposite sides of the vehicle, and at the rear. The control valve 300 has the air pressure inlet control valve 320a controlling the inlet port 315 that receives fluid under pressure from a high-pressure supply reservoir 305 maintained under a relatively constant air pressure by means of the compressor 306 suitably driven by the engine of the vehicle. Air is supplied to the air springs 301 and 302 simultaneously through the check valves 370 and 371 in the manner heretofore described with reference to Figs. 1 to 8. Air under pressure is exhausted from the air springs 301 and 302 through the check valves 380 and 381, and thence through the exhaust control valve 321a to the exhaust port 316 in the manner heretofore described. From the foregoing description regarding Figs. 1 to 8, it will be apparent that cross flow of air between air springs 301 and 302 is prevented by the check valves 370, 371, 380 and 381 in the manner heretofore described.

The height control valve 400 has an air pressure inlet valve 420a controlling air into the air inlet chamber 420 from which the air flows through the check valve 201 and thence through the line 402 to the air spring 401. Air is exhausted from the air spring by return flow through the line 402 into the exhaust chamber 421 and thence through the exhaust valve 421a to atmosphere. The check valve 201 prevents exhaust air from entering the inlet chamber 420.

Similarly, height control valve 500 has an air inlet control valve 521a that controls air supply into the air inlet chamber 520 that then flows through the check valve 201 into the line 502 for supplying the air spring 501, Exhaust of air from the air spring 501 is by return flow through the line 502 into the exhaust chamber 521 and thence through the exhaust control valve 520a to atmosphere.

The two height control valves 400 and 500, incorporating their respective check valves 201, prevent cross flow of air between the air springs 401 and 501 when the vehicle is rounding a curve. Air under pressure caused by this condition, under the assumed circumstances heretofore described, cannot flow from the air spring 401 to the air spring 501 since check valve 201 of control valve 400 prevents air from entering the inlet chamber 420 which would normally permit air to cross flow to the exhaust valve 521 of valve 500, since under the roll condition described, the left-hand air spring tends to be compressed which would normally open inlet valve 420 of valve 400, and since exhaust valve 521a of valve 500 would be open because of the expansion of the air spring on the right-hand side of the vehicle and air could flow through check valve 201 of valve 500 into the air spring 501. But with check valve 201 of valve 400 being closed against flow of air under pressure into the inlet chamber 420 of valve 400, this cross flow of air between the air springs 401 and 501 is prevented. It is apparent that upon a reversal of conditions in rounding a curve, cross flow of air from spring 501 is prevented with spring 401.

While the embodiments of the present invention as herein disclosed constitute a preferred form, it is to be understood that other forms might be adopted.

What is claimed is as follows:

1. A height control or leveling valve for use in a fluid suspension system for a vehicle comprising, a valve body, said valve body having a fluid inlet chamber and a separate fluid exhaust chamber, an oscillatable actuating shaft journalled in said body between said chambers and extending into both of said chambers and projecting from said body adjacent one of said chambers and including seal means on said shaft to prevent transfer of fluid pressures between said chambers, separate inlet and exhaust valve means in said body in fluid communication with said inlet and exhaust chambers respectively, separate valve actuating means secured to said shaft in each of said chambers engaging respectively the inlet and exhaust valve means, a damping piston reciprocable in a cylinder in said body positioned adjacent corresponding ends of said chambers, and a damping piston actuating member secured to said shaft extending through a third chamber in said body between said first mentioned chambers and connecting with said cylinder into engagement with said damping piston to reciprocate the same with oscillation of said shaft.

2. A height control or leveling valve for use in a fluid suspension system for a vehicle comprising, a valve body, said valve body having a fluid inlet chamber and a separate fluid exhaust chamber, said chambers being disposed in parallel relation in said body, an oscillatable actuating shaft in said body extending into said body from one side thereof through one of said chambers and then through said body between said chambers into the other of said chambers, said shaft means having seal means thereon between said chambers preventing interchange of fluid pressures therebetween, separate inlet and exhaust valve means in said body in fluid communication with said inlet and exhaust chambers respectively, separate valve actuating means secured to said shaft in each of said chambers and engaging respectively the inlet and exhaust valve means, a damping piston reciprocable in a cylinder in said body positioned adjacent corresponding ends of said chambers, a third chamber in said valve body between said inlet and exhaust chambers parallel thereto and communicating with said cylinder, and a damping piston actuating member secured to said shaft and extending through said third chamber into engagement with said damping piston to reciprocate the same with oscillation of said shaft.

3. A height control or leveling valve for use in a fluid suspension system for a vehicle comprising, a valve body, said valve body having a fluid inlet chamber and a separate fluid exhaust chamber, said chambers being disposed in parallel relation in said body, an oscillatable actuating shaft in said body extending into said body from one side thereof through one of said chambers and then through said body between said chambers into the other of said chambers, said shaft means having seal means thereon between said chambers preventing interchange of fluid pressures therebetween, separate inlet and exhaust valve means in said body in fluid communication with said inlet and exhaust chambers respectively, separate valve actuating arms secured to said shaft in each of said chambers extending generally radially therefrom and engaging respectively the inlet and exhaust valve means, a damping piston reciprocable in a cylinder in said body positioned adjacent corresponding ends of said chambers, a third chamber in said valve body between said inlet and exhaust chambers parallel thereto and communicating with said cylinder, and a damping piston actuating member secured to said shaft and extending generally radially therefrom through said third chamber into engagement with said damping piston to reciprocate the same with oscillation of said shaft.

4. A height control or leveling valve assembly for use in a fluid suspension system for a vehicle comprising, a valve body, inlet and exhaust valve means in said body for controlling fluid flow through the valve body, an oscillatable shaft in said body having valve actuating means secured thereto and extending therefrom generally radially at one side of said shaft and engaging said valve means to actuate the same on oscillation of said shaft, a damping piston reciprocable in a cylinder in said body, and piston actuating means rigid with and extending generally radially of said shaft at the same side thereof as said valve actuating means for oscillation therewith and engaging said piston to reciprocate the same concurrently with and to the same extent as oscillation of said shaft, and stop means at each end of said cylinder engaged by said piston limiting maximum movement of said piston in its reciprocating stroke in either direction and thereby limiting maximum oscillation movement of said shaft and thereby limiting movement of said valve means in the full opening direction.

5. A height control or leveling valve assembly for use in a fluid suspension system for a vehicle comprising, a valve body, inlet and exhaust valve means in said body for controlling fluid flow through the valve body, an oscillatable shaft in said body having valve actuating means secured thereto and extending therefrom generally radially at one side of said shaft and engaging said valve means to actuate the same on oscillation of said shaft, a damping piston reciprocable in a cylinder in said body adjacent one end of said valve actuating means, and piston actuating means rigid with said shaft in pendulum arrangement engaging said piston to reciprocate the same concurrently with and to the same extent as oscillation of said shaft, said cylinder having end walls at its opposite ends engageable by said piston providing thereby limit stops controlling the extent of reciprocable movement of said piston and thereby controlling maximum oscillation of said shaft and thereby limiting movement of said valve means in the full opening direction.

6. A height control or leveling valve assembly for use in a fluid suspension system for a vehicle comprising, a valve body, inlet and exhaust valve means in said body for controlling fluid flow through the valve body, an oscillatable shaft in said body having valve actuating means extending therefrom and engaging said valve means to actuate the same on oscillation of said shaft, a cylinder bore in said body positioned generally horizontal and receiving a damping piston reciprocable in said cylinder, said body having a chamber extending generally vertically relative to said cylinder at substantially the mid portion thereof, said cylinder and at least a portion of said chamber being filled with damping fluid, and a damping piston actuating member projecting from said shaft through said chamber and engaging said piston to reciprocate the same on oscillation of said shaft, said cylinder having a recess substantially intermediate the ends thereof in communication with said chamber and being of an axial length equal to the axial length of the portion of said damping piston in the area of the recess covered by the piston, said damping piston opening fluid connection selectively between said chamber and said cylinder on movement of the piston in either direction selectively from a position centered relative to said recess, said piston having valve members on each of opposite ends providing for free flow of fluid from the ends of said cylinder selectively through said piston on movement of the piston selectively from either end of the cylinder to a center position covering said recess and preventing flow in the opposite direction of piston movement from center position, opposite ends of said recess cutting off free flow of fluid from the respective ends of said cylinder selectively on movement of the piston selectively toward the respective ends of said cylinder, said piston having means providing restrictive flow of fluid selectively from the ends of the cylinder to said chamber on said last mentioned movement, whereby said piston damps movement of said piston actuating means on movement from a center position of the piston closing said recess toward either end of the cylinder and permits quick return of the piston to center position.

7. A height control or leveling valve assembly for use in a fluid suspension system for a vehicle comprising, a valve body, inlet and exhaust valve means in said body for controlling fluid flow through the valve body, an oscillatable shaft in said body having valve actuating means extending therefrom and engaging said valve means to actuate the same on oscillation of said shaft, a cylinder bore in said body having a damping piston therein reciprocable in said cylinder, said body including a fluid reservoir chamber for said cylinder bore, said cylinder bore and at least a portion of said reservoir chamber being filled with damping fluid, and a damping piston actuating member extending from said shaft and engaging said piston to reciprocate the same on oscillation of said shaft, passage means between said chamber and said cylinder bore, means on said piston closing off said passage means when the piston is in an intermediate position but at least opening said passage means to one end of said cylinder during a portion of the initial movement of the piston toward the other end of said cylinder away from said intermediate position, said piston having valve members on each of opposite ends providing for free flow of fluid to the ends of said cylinder selectively through said piston on movement of the piston selectively from either end of the cylinder and preventing flow in the opposite direction of piston movement, means providing restrictive flow of fluid selectively from the ends of the cylinder to said chamber on said last mentioned movement, whereby said piston damps movement of said piston actuating means on movement from an intermediate position of the piston toward either end of the cylinder and permits quick return of the piston to said first position from at least one end of the cylinder.

8. A height control or leveling valve assembly for use in a fluid suspension system for a vehicle comprising, a valve body, inlet and exhaust valve means in said body for controlling fluid flow through the valve body, an oscillatable shaft in said body having valve actuating means extending therefrom and engaging said valve means to actuate the same on oscillation of said shaft, a cylinder bore in said body having a damping piston therein reciprocable in said cylinder, said body including a fluid reservoir chamber for said cylinder bore connected therewith for supply of fluid thereto, said cylinder bore and at least a portion of said reservoir chamber being filled with damping fluid, and a damping piston actuating member extending from said shaft and engaging said piston to reciprocate the same on oscillation of said shaft, one of said cylinder or said piston having passage means forming bypass passage means from each of opposite ends of said cylinder to said chamber opened selectively during a portion of the initial movement thereof in either of opposite directions from a normal static position in said cylinder and closed with said piston in said normal static position, one of said cylinder or said piston also having valve means connecting either of opposite ends of said cylinder with said chamber selectively for free flow of fluid from the chamber into the respective end of the cylinder on selective opposite movement of said piston away from the respective opposite end of said cylinder toward said normal static position and preventing fluid flow therebetween on opposite movement thereof, one of said cylinder or said piston also having resistance passage means connecting each of opposite ends of said cylinder with said chamber selectively on movement of said piston away from said normal static position selectively toward either of opposite ends of said cylinder to resist thereby movement of said piston from said static position toward the selected respective end of said cylinder whereby said piston damps movement of said piston actuating means from said static position of the piston toward either end of said cylinder and thereby damps movement of said valve means in one direction of movement and permits opposite quick return movement of the piston to said static position and thereby quick return movement of said valve means in its opposite direction of movement.

9. A height control or leveling valve assembly for use in a fluid suspension system for a vehicle comprising, a valve body, said body having separate fluid inlet and fluid exhaust chambers, inlet and exhaust valve means in said body for separately controlling fluid flow through said inlet and exhaust chambers of the valve, an oscillatable shaft journalled in said body and extending through said inlet and exhaust chambers and having valve actuating means secured thereto in each of said chambers and extending therefrom generally radially at one side of said shaft in the same plane with free ends engaging said valve means to actuate the same separately on oscillation of said shaft, a damping piston reciprocable in a cylinder in said body adjacent the free ends of the said valve actuating means, and piston actuating means rigid with and extending generally radially of said shaft between said valve actuating means for oscillation therewith and engaging said piston to reciprocate the same concurrently with and to the same extent as oscillation of said shaft.

References Cited in the file of this patent

UNITED STATES PATENTS

| | | |
|---|---|---|
| 1,895,477 | McCune | Jan. 31, 1933 |
| 1,988,690 | Kettle | Jan. 22, 1935 |
| 2,400,048 | Jones | May 7, 1946 |
| 2,417,278 | Van Der Werff | Mar. 11, 1947 |
| 2,670,201 | Rossman | Feb. 23, 1954 |
| 2,809,051 | Jackson | Oct. 8, 1957 |
| 2,841,178 | Schultz | July 1, 1958 |

FOREIGN PATENTS

| | | |
|---|---|---|
| 181,078 | Canada | of 1917 |
| 1,003,856 | France | of 1951 |
| 786,849 | Great Britain | of 1957 |